United States Patent [19]

Herlacher

[11] 4,004,107

[45] Jan. 18, 1977

[54] TELEPHONE CIRCUIT TO ELIMINATE USE OF A HOLD BUTTON

[75] Inventor: Richard E. Herlacher, Camp Hill, Pa.

[73] Assignee: International Telephone and Telegraph Corporation, Nutley, N.J.

[22] Filed: Oct. 10, 1975

[21] Appl. No.: 622,287

Related U.S. Application Data

[63] Continuation-in-part of Ser. No. 549,240, Feb. 11, 1975, abandoned.

[52] U.S. Cl. .................................. 179/99; 179/1 CN
[51] Int. Cl.² ...................... H04M 1/72; H04M 3/56
[58] Field of Search ...... 179/1 CN, 1 H, 99, 18 BC

[56] References Cited

UNITED STATES PATENTS

| | | | |
|---|---|---|---|
| 3,423,532 | 1/1969 | Coel et al. ..................... | 179/1 CN |
| 3,515,807 | 6/1970 | Clark ............................... | 179/1 CN |
| 3,725,601 | 3/1973 | Jetzt et al. ..................... | 179/99 |
| 3,819,871 | 6/1974 | Verdon ............................ | 179/99 |

Primary Examiner—Kathleen H. Claffy
Assistant Examiner—Randall P. Myers
Attorney, Agent, or Firm—John T. O'Halloran; Alfred C. Hill

[57] ABSTRACT

A circuit arrangement to enable one party to have a two-way conversation simultaneously with an outside party and an internal party. The circuit arrangement includes circuitry so that the outside party cannot hear anything that is said by the internal party or vice versa. Thus, the one party has the ability to talk to both the outside and the internal party without them hearing each other while using one subset and not putting anyone on hold. In addition, the circuitry includes a button which when depressed enables all three parties to be put into a two-way conference.

19 Claims, 4 Drawing Figures

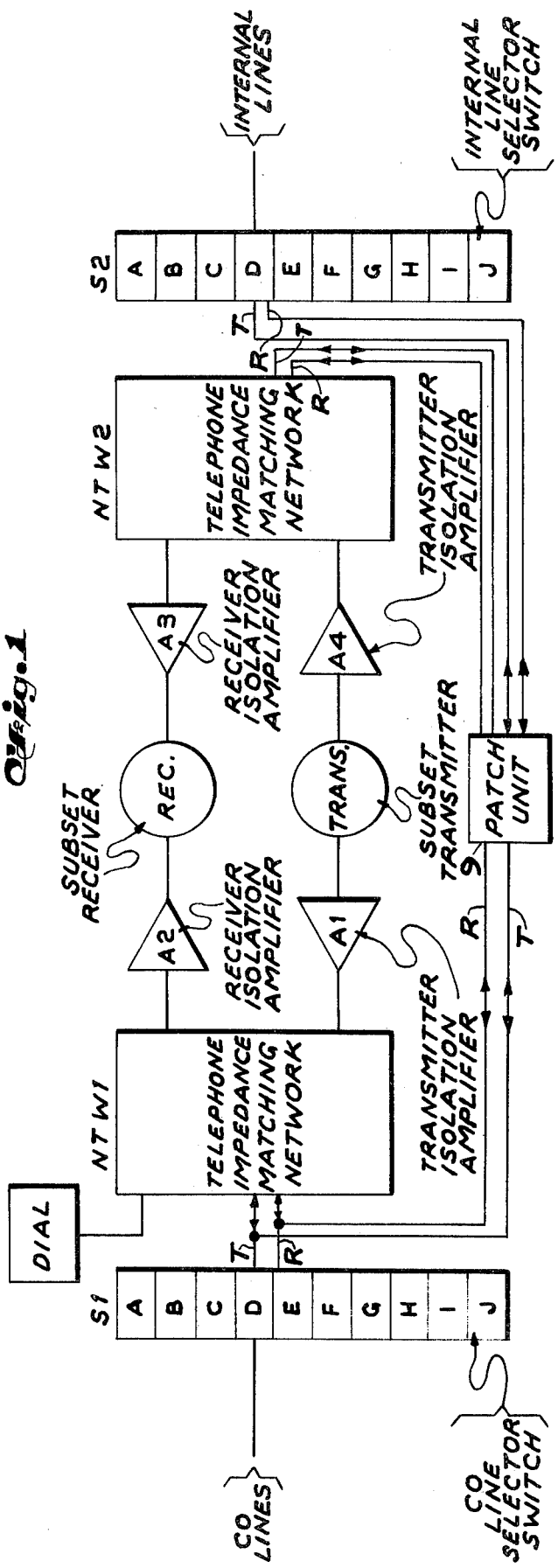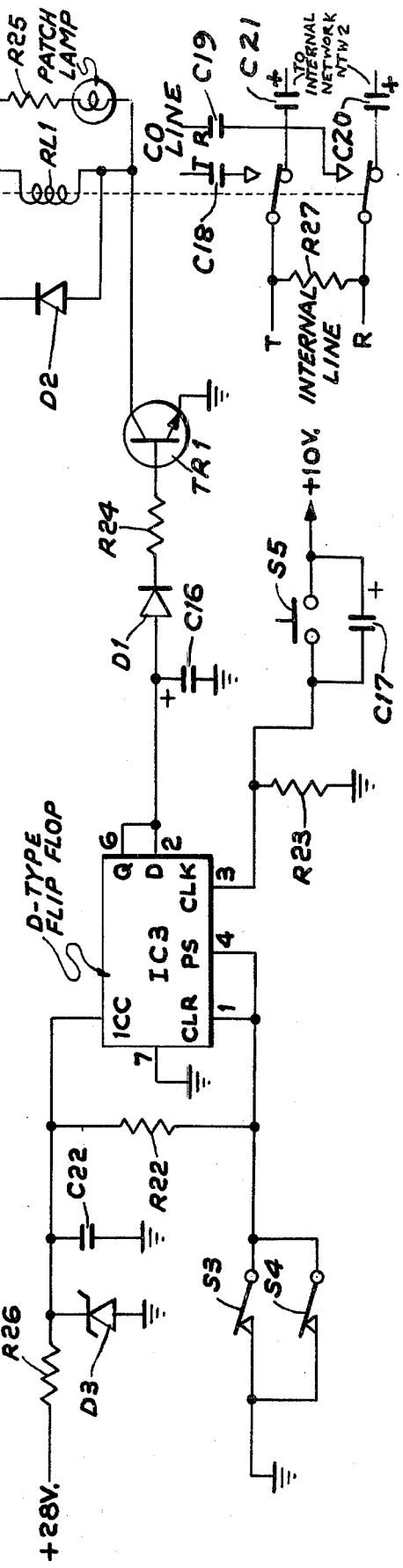

TELEPHONE CIRCUIT TO ELIMINATE USE OF A HOLD BUTTON

CROSS-REFERENCE TO RELATED APPLICATIONS

This is a continuation-in-part application of copending application Ser. No. 549,240, filed Feb. 11, 1975, now abandoned.

BACKGROUND OF THE INVENTION

This invention relates to telephone systems and more particularly to telephone circuits employing key telephone systems.

Existing key telephone systems having the capabilities for outside as well as internal communications require the use of two subsets or placing the outside call on hold while the internal call is conducted. In either case, this requires depressing many buttons or manipulating several subsets to perform the desired operation.

There are several shortcomings to the above operating procedures. If the two subset approach is used, there is always the inconvenience of holding the two subsets. If the single subset is used in conjunction with the hold button, the outside party who is calling for some type of assistance does not have the assurance that anything is being done to solve his problems since he does not hear any part of the conversation that transpires internally.

SUMMARY OF THE INVENTION

An object of the present invention is to provide a telephone circuit at the subset which will overcome the aforementioned difficulties.

The aforementioned difficulties are overcome in that with the new telephone circuit neither two subsets or the holding button need to be used. When this new telephone circuit is used, one party using the new telephone circuit using one handset is able to have a two-way conversation with the outside part as well as with the internal party. At the same time, the outside party cannot hear anything that is said by the internal party or vice versa. In short, this gives the party employing the new telephone circuit the ability to talk to both parties without them hearing each other while using one handset and not putting anyone on hold. As an additional benefit, by depressing a designated button all three parties can be put into a two-way conference.

A feature of the present invention is the provision of a telephone circuit to eliminate use of a hold button comprising: a subset having a receiver and a transmitter for use by one party; a plurality of central office lines connected to outside parties; a plurality of internal lines connected to internal parties; first means to couple the receiver and the transmitter to a selected one of the central office lines to enable a first two-way conversation between the one party and a selected one of the outside parties; second means to couple the receiver and the transmitter to a selected one of the internal lines to enable a second two-way conversation between the one party and a selected one of the internal parties; and third means coupled between the input of the first means the input of the second means, the third means having a first state to enable the first and second conversations to be carried on simultaneously and to prevent the selected one of the outside parties and the selected one of the internal parties from hearing each other and a second state to selectively enable the one party, the selected one of the outside parties and the selected one of the internal parties to be placed in a two-way conference.

BRIEF DESCRIPTION OF THE DRAWING

Above-mentioned and other features and objects of this invention will become more apparent by reference to the following description taken in conjunction with the accompanying drawing, in which:

FIG. 1 is a block diagram of the telephone circuit in accordance with the principles of the present invention;

FIG. 3 is a schematic diagram partially in block form of the patch unit of FIG. 1.

DESCRIPTION OF THE PREFERRED EMBODIMENT

Referring to FIG. 1, when a call comes in from outside on the CO (Central Office) lines, the signal is connected to a standard telephone impedance matching network NTW1 by depressing the proper one of flashing buttons A–J of the CO line selector switch S1. Network NTW1 contains all of the components necessary to match the impedances of the transmitter and receiver to the selected CO lines. The received signal at the receive part of network NTW1 passes through isolation amplifier A2 to the subset receiver REC. The signal from the subset transmitter TRANS passes through isolation amplifier A1 back to network NTW1, thus completing the connection to an outside or CO line.

If at this same time it is desired to also talk to an internal party, the desired internal line is selected by depressing the appropriate one of buttons A–J on internal line selector switch S2. The transmitter signal of the subset goes through the isolation amplifier A4 to the telephone impedance matching network NTW2 and then through internal line selector switch S2 to the selected internal line. Network NTW2 contains all the components necessary to match the impedances of the subset transmitter and receiver to the selected internal line. The received signal comes in through select switch S2 through network NTW2 and through isolation amplifier A3 to the subset receiver REC. In this condition, the party employing the subset can hold a two-way conversation with both the external and internal parties, but the internal party cannot hear the outside party and vice versa.

If it is needed to patch all three parties together for a conference, this can be done by depressing a patch button and all parties are connected together via the patch unit 9.

Figure 2:
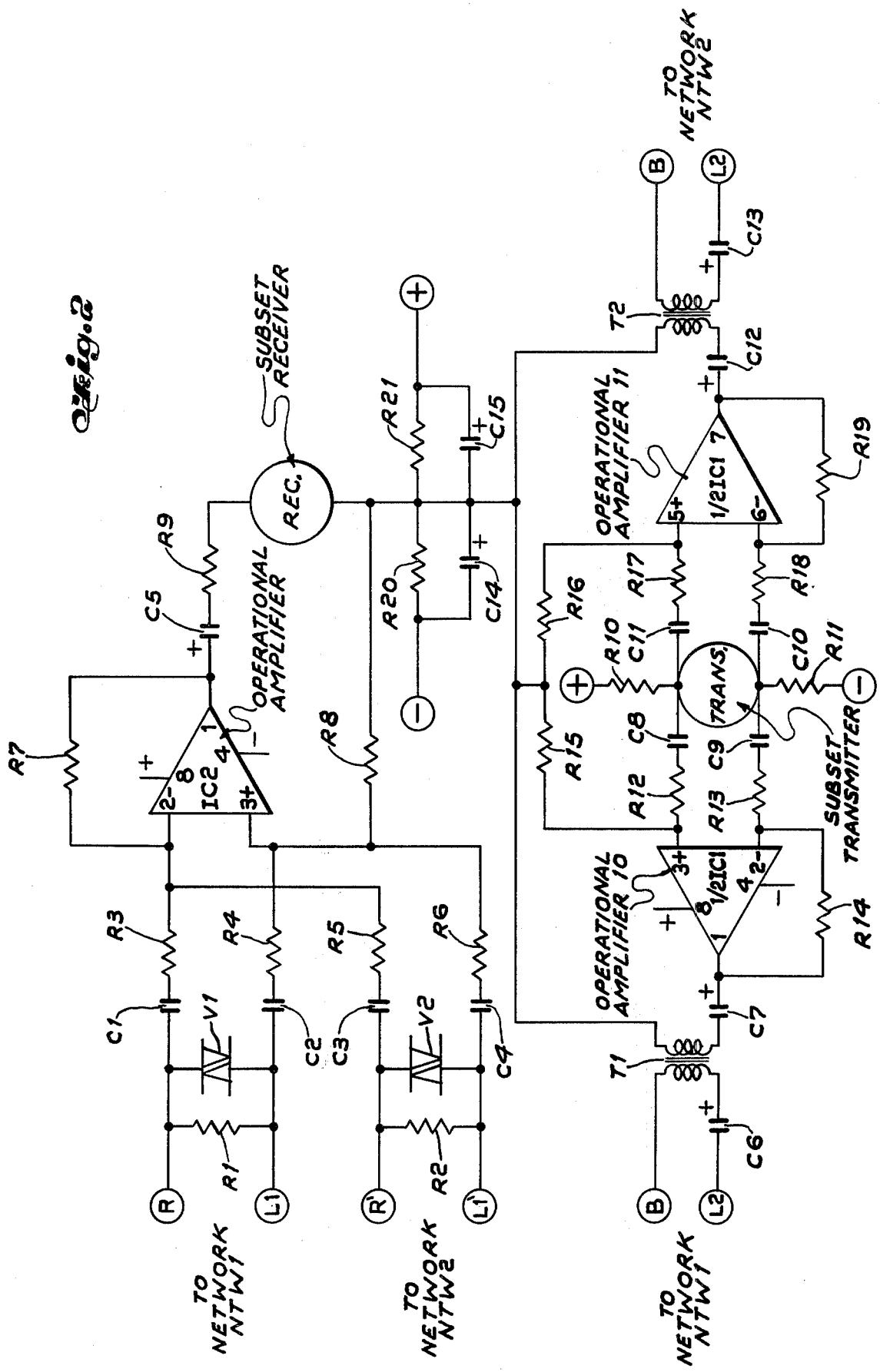
FIG. 2 is a schematic diagram partially in block form of the subset receiver and transmitter and their associated isolation amplifiers of FIG. 1.

Referring to FIG. 2, the transmit circuitry of the new telephone circuit will be described. Resistors R20 and R21 and capacitors C14 and C15 provide a filtered plus and minus 14 volts to power the operational amplifiers 10, 11 and IC2. Resistors R10 and R11 provide the DC (direct current) current to operate the subset transmitter TRANS. Capacitors C8 and C9 are used to couple the signal into operational amplifier 10. Resistors R12, R13, R14 and R15 set the gain and input impedance of amplifier 10. Amplifier 10 is an operational amplifier used with differential inputs in order to reduce the amplification of a common mode signal. Capacitor C7 couples the transmit signal to the matching transformer T1. Transformer T1 and capacitor C6 provide isolation and couple the transmitter signal into the CO network NTW1. The circuit including capacitors C10–C13, resistors R16–R19, operational amplifier 11 and transformer T2 perform the same function as above, but for an internal call.

The receive circuitry of the new telephone circuit is shown in FIG. 2 and includes resistors R1 and R2 to provide a load on the telephone networks NTW1 and NTW2, respectively. Varistors V1 and V2 provide voltage transient protection for the input of amplifier IC2. Capacitors C1, C2, C3 and C4 couple the received signal from the networks NTW1 and NTW2 into amplifier IC2. Resistors R3, R4, R7 and R8 set the gain and input impedance for the received signal from the network NTW1. Resistors R5, R6, R7 and R8 set the gain and input impedance for the received signal from the network NTW2. Amplifier IC2 is an operational amplifier used as a summing amplifier with differential inputs. The high input impedance of amplifier IC2 prevents any cross-talk between the two input signals. Capacitor C5 couples the received signal through the impedance matching resistor R9 to the subset receiver REC.

Referring to FIG. 3 there is illustrated therein a schematic diagram partially in block form of the patch unit 9 of FIG. 1. A CMOS (clad metal oxide semiconductor) D-type flip flop IC3 is used to convert the momentary action conference switch S5 into an alternate action switch to control patch relay RL1. Resistor R23 and capacitor C17 provide an RC circuit to debounce the momentary switch S5. Anytime a positive going pulse is present at pin 3, the clock input of flip flop IC3, the output at pins 6 and 2, Q and D terminals, respectively, will change state. Resistor R22 holds pins 1 and 4 at 10 volts DC when switches S3 and S4 are both open. When either switches S3 or S4 are closed, the output signal of Q and D terminals go to binary 0. Switches S3 and S4 are located on the ends of line selector switches S1 and S2 of FIG. 1, respectively, and are closed when all buttons are up and are opened when at least one button is depressed. Diode D1 and capacitor C16 suppress any spikes present going into switching transistor TR1. Resistor R24 limits current into transistor TR1. Transistor TR1 switches relay RL1 and the patch lamp on when the output of flip flop IC3 is high, a binary 1, and off when the output of flip flop IC3 is low, a binary 0. Diode D2 provides spike protection. Resistor R25 reduces the 28 volts DC to 10 volts DC to illuminate the patch lamp. Capacitors C18 and C19 are used to couple the tip and ring conductors of the outside and internal lines together when relay RL1 is activated. Capacitors C20 and C21 provide DC isolation for network NTW2. Resistor R27 provides a load for the internal line. Resistors R26, capacitor C22 and zener diode D3 provide a regulated 10 volts DC to flip flop IC3 from the 28 volts DC supply.

Figure 4:
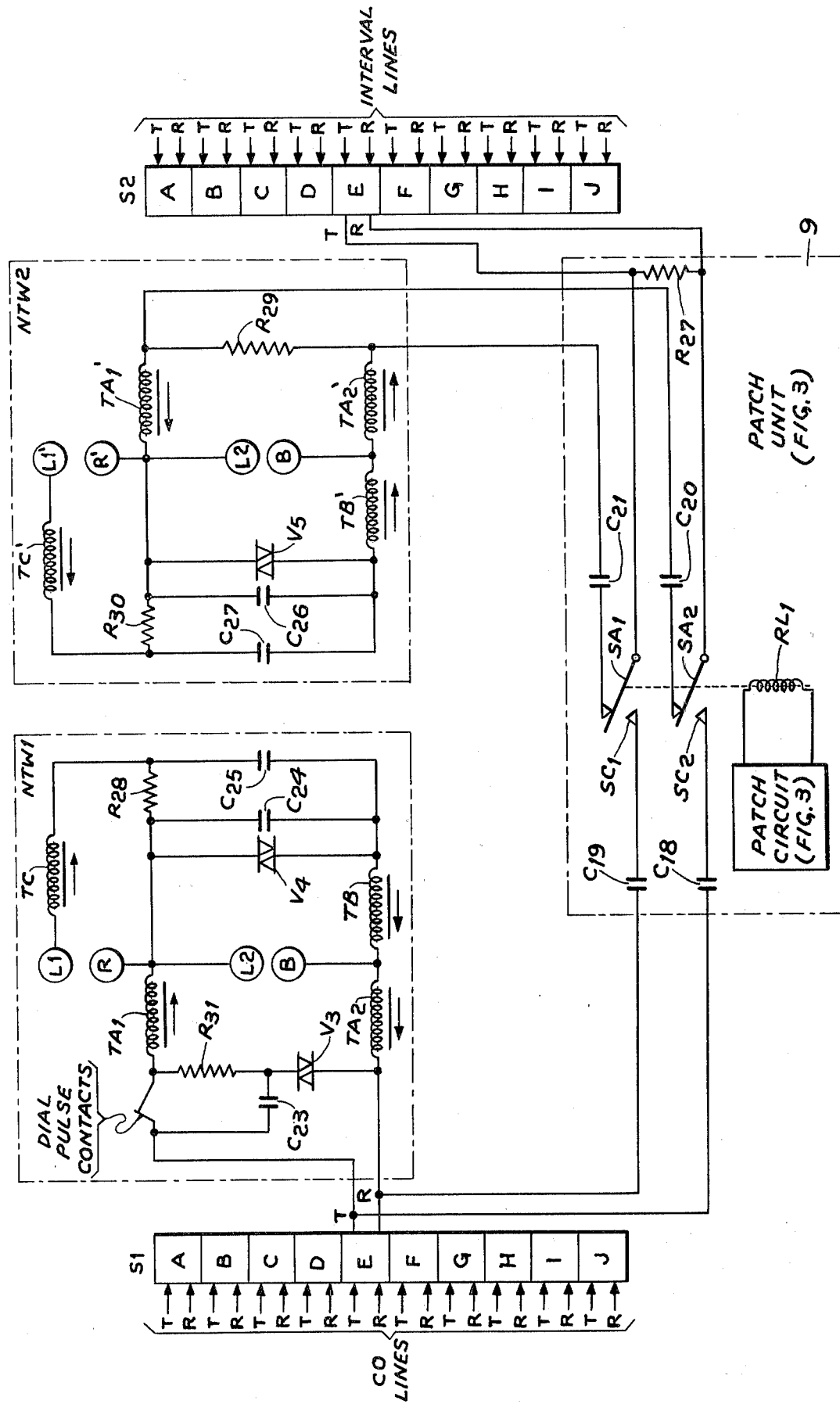
FIG. 4 is a schematic diagram partially in block form of the telephone impedance matching networks NTW1 and NTW2 and their interconnection with patch unit 9 of FIG. 1.

Referring to FIG. 4 there is illustrated a schematic diagram of an implementation of networks NTW1 and NTW2 and their interconnection to patch unit 9. Networks NTW1 and NTW2 provide a two wire to four wire conversion by connecting the tip (T) conductor and the ring (R) conductor of switches S1 and S2, respectively, to the transmit and receive amplifiers of FIG. 2. The terminals labelled L1, R, L2 and B of network NTW1 are connected to similarly labelled terminals of FIG. 2 labelled TO NETWORK NTW1 and the terminals labelled L1′, R′, L2 and B of network NTW2 are connected to similarly labelled terminals of FIG. 2 labelled TO NETWORK NTW2.

Network NTW1 includes four coils TA1, TA2, TB and TC of a transformer. The arrows associated with each of the coils indicates the direction of winding of its associated coil. Received speech currents pass via coils TA1, TB and TA2, each of which produces by induction an additive voltage in coil TC. The received currents also produce a voltage across resistor R28 that opposes and is almost equal to that produced by the induced voltages in coil TC. There is, therefore, very little power loss in resistor R31 and varistor V3 and maximum power is present in the receiver connected to terminals L1 and R. The low impedance of the transmitter connected to terminals L2 and B is matched to the loop by the turns ratio of coil TB to coils TA1 and TA2.

Current variations due to the transmitter are in opposite phase in coils TA and TB. The induced voltages in coil TC are also in opposite phase and the resultant voltage is opposed by the voltage produced across resistor R28. The net effect is that very small signals are produced in the receiver due to transmitter current changes and sidetone is very low. Also, since there is little power loss in the receiver, maximum transmitting levels are attained. Both varistors V3 and V4 contribute to this condition by automatically compensating for various loop conditions to provide close matching of the loop impedance and the balancing network impedance with the transmitter circuit.

Resistor R31 and capacitor C23 provide a filter network to suppress high frequency signal components of the dial pulses which might otherwise be radiated from the telephone line and cause local interference with broadcast radio reception.

The implementation and operation of network NTW2 is identical with that of network NTW1 except that the resistor and varistor series circuit and the capacitor associated therewith is replaced by resistor R29. This is possible since in the internal network NTW1 there is no DC present therein.

As can be seen from FIG. 4 patch unit 9 of FIG. 3 has a first state with switch arms SA1 and SA2 in the position shown. In this first state patch unit 3 connects the internal lines to network NTW2 and prevents the internal lines to be coupled to the external lines. As a result the one party has the ability to talk to both the selected outside and selected inside party without them hearing each other. When switch S5 is depressed patch unit 9 assumes a second state. In this second state relay RL1 is energized and switch arms SA1 and SA2 are moved into their other position to contact switch contacts SC1 and SC2. This results in the selected internal line being coupled directly to capacitors C18 and C19 and hence to the input of network NTW1. With this connection network NTW2 is bypassed, but network NTW1 and its associated circuits of FIG. 2 are still in the circuit and operative. The two-way conference between the three parties is provided by network NTW1 which is still in operation. Network NTW1 passes the speech of the three parties in both directions and thereby establishes a two-way conference between all three parties. During the patch mode or second state of patch unit 9 it is not required that both networks NTW1 and NTW2 be in use since there is no longer isolation between the CO and internal lines.

The values and types of the components employed in FIGS. 2, 3 and 4 of a successful reduction to practice are set forth hereinbelow.

| | |
|---|---|
| R1 & R2 | 150 ohms, 1/2 watt resistor |
| R3, R4, R5, R6 | 150K ohms, 1/2 watt resistor |
| R7 & R8 | 220K ohms, 1/2 watt resistor |
| R9 | 100 ohms, 1/2 watt resistor |
| R10, R11, R20, R21 | 1.5K ohms, 1/2 watt resistor |
| R12, R13, R17, R18 | 47K ohms, 1/2 watt resistor |
| R14, R15, R16, R19 | 1M ohms, 1/2 watt resistor |
| R22 | 10K ohms, 1/2 watt resistor |
| R23, R24 | 4.7K ohms, 1/2 watt resistor |
| R25 | 390 ohms, 1/2 watt resistor |
| R26 | 6.8K ohms, 1/2 watt resistor |
| R27, R29 | 680 ohms, 1 watt resistor |
| R28, R30 | 68 ohms, 1/2 watt resistor |
| R31 | 180 ohms, 1/2 watt resistor |
| C1, C2, C3, C4, C8, C9, C10, C11 | 0.1 ufd, 100v capacitor |
| C5, C6, C7, C12, C13, C16, C20, C21, C25, C27 | 2.2 mfd, 64v capacitor |
| C14, C15 | 32 ufd, 50v capacitor |
| C17 | 1 ufd 50v capacitor |
| C18, C19 | 10 ufd, N.P. capacitor |
| C22 | 6.4 mfd, 25v capacitor |
| C24, C26 | 0.47 mfd, 64v capacitor |
| D1, D2 | GR 22 diode |
| D3 | 10v zener diode |
| T1, T2 | Transformer 30K ohms secondary, 200 ohms primary |
| V1, V2, V3, V4, V5 | Varistor |
| IC1, IC2 | LM1458 integrated circuit |
| IC3 | MM74C74 dual D flip flop integrated circuit |
| TR1 | 2N3568 NPN transistor |
| RL1 | 2PDT relay, 24 volts |
| TA1, TA2, TB, TC | coils of a transformer, network NTW1 |
| TA1', TA2', TB', TC' | coils of a transformer, network NTW2 |

While I have described above the principles of my invention in connection with specific apparatus, it is to be clearly understood that this description is made only by way of example and not as a limitation to the scope of my invention as set forth in the objects thereof and in the accompanying claims.

I claim:

1. A telephone circuit to eliminate use of a hold button comprising:
    a subset having a receiver and a transmitter for use by one party;
    a plurality of central office lines connected to outside parties;
    a plurality of internal lines connected to internal parties;
    first means to couple said receiver and said transmitter to a selected one of said central office lines to enable a first two-way conversation between said one party and a selected one of said outside parties;
    second means to couple said receiver and said transmitter to a selected one of said internal lines to enable to second two-way conversation between said one party and a selected one of said internal parties; and
    third means coupled between said first means and said second means, said third means having a first state to enable said first and second conversations to be carried on simultaneously and to prevent said selected one of said outside parties and said selected one of said internal parties from hearing each other and a second state to selectively enable said one party, said selected one of said outside parties and said selected one of said internal parties to be placed in a two-way conference.

2. A circuit according to claim 1, wherein said first means includes
    a line selector switch coupled to said plurality of central office lines to enable selection of said selected one of said central office lines,
    an impedance matching network coupled to said line selector switch,
    a receiver isolation amplifier coupled between said impedance matching network and said receiver, and
    a transmitter isolation amplifier coupled between said impedance matching network and said transmitter.

3. A circuit according to claim 2, wherein said receiver isolation amplifier includes
    a first operational amplifier employed as a summing amplifier with differential inputs.

4. A circuit according to claim 3, wherein said transmitter isolation amplifier includes
    a second operational amplifier with differential inputs to reduce the amplification of a common mode signal.

5. A circuit according to claim 2, wherein said transmitter isolation amplifier includes
    an operational amplifier with differential inputs to reduce the amplification of a common mode signal.

6. A circuit according to claim 1, wherein said second means includes
    a line selector switch coupled to said plurality of internal lines to enable selection of said selected one of said internal lines,
    an impedance matching network coupled to said line selector switch, through said third means
    a receiver isolation amplifier coupled between said impedance matching network and said receiver, and a transmitter isolation amplifier coupled between said impedance matching network and said transmitter.

7. A circuit according to claim 6, wherein
said receiver isolation amplifier includes
 a first operational amplifier employed as a summing amplifier with differential inputs.

8. A circuit according to claim 7, wherein
said transmitter isolation amplifier includes
 a second operational amplifier with differential inputs to reduce the amplification of a common mode signal.

9. A circuit according to claim 6, wherein
said transmitter isolation amplifier includes
 an operational amplifier with differential inputs to reduce the amplification of a common mode signal.

10. A circuit according to claim 1, wherein
said third means includes
 a source of direct current voltage,
 a momentary action switch coupled to said source,
 a D-type flip flop having a D terminal, a Q terminal and a clock terminal, said clock terminal being coupled to said switch, and
 a relay coupled to said D and Q terminals, said relay interconnecting said selected one of said central office lines and said selected one of said internal office lines when the output signal of said D and Q terminals are high.

11. A circuit according to claim 1, wherein
said first means includes
 a first line selector switch coupled to said plurality of central office lines to enable selection of said selected one of said central office lines,
 a first impedance matching network coupled to said first line selector switch,
 a first receiver isolation amplifier coupled between said first impedance matching network and said receiver, and
 a first transmitter isolation amplifier coupled between said first impedance matching network and said transmitter, and
said second means includes
 a second line selector switch coupled to said plurality of internal lines to enable selection of said selected one of said internal lines,
 a second impedance matching network coupled to said second line selector switch through said third means,
 a second receiver isolation amplifier coupled between said second impedance matching network and said receiver, and
 a second transmitter isolation amplifier coupled between said second impedance matching network and said transmitter.

12. A circuit according to claim 11, wherein
said first and second receiver isolation amplifiers include
 a common operational amplifier employed as a summing amplifier with differential inputs.

13. A circuit according to claim 12, wherein
each of said first and second transmitter isolation amplifiers includes
 an operational amplifier with differential inputs to reduce the amplification of a common mode signal.

14. A circuit according to claim 11, wherein
each of said first and second transmitter isolation amplifiers includes
 an operational amplifier with differential inputs to reduce the amplification of a common mode signal.

15. A circuit according to claim 11, wherein
said third means is connected between the output of said first and second line selector switches and to the input of said second impedance matching network.

16. A circuit according to claim 15, wherein
said third means includes
 a source of direct current voltage,
 a momentary action switch coupled to said source,
 a D-type flip flop having a D terminal, a Q terminal and a clock terminal, said clock terminal being coupled to said switch, and
 a relay coupled to said D and Q terminals, said relay interconnecting said selected one of said central office lines and said selected one of said internal office lines when the output signal of said D and Q terminals are high.

17. A circuit according to claim 16, wherein
said first and second receiver isolation amplifiers include
 a common operational amplifier employed as a summing amplifier with differential inputs.

18. A circuit according to claim 17, wherein
each of said first and second transmitter isolation amplifiers includes
 an operational amplifier with differential inputs to reduce the amplification of a common mode signal.

19. A circuit according to claim 16, wherein
each of said first and second transmitter isolation amplifiers includes
 an operational amplifier with differential inputs to reduce the amplification of a common mode signal.

* * * * *